(12) United States Patent
Grushkevich

(10) Patent No.: US 7,844,222 B2
(45) Date of Patent: Nov. 30, 2010

(54) METHOD AND SYSTEM FOR CHANGING PRIORITY OF SLAVE FRAMES IN MULTIWIRE COEXISTENCE

(75) Inventor: Asif Grushkevich, LaJolla, CA (US)

(73) Assignee: Broadcom Corporation, Irvine, CA (US)

( * ) Notice: Subject to any disclaimer, the term of this patent is extended or adjusted under 35 U.S.C. 154(b) by 840 days.

(21) Appl. No.: 11/439,776

(22) Filed: May 24, 2006

(65) Prior Publication Data

US 2007/0275662 A1   Nov. 29, 2007

(51) Int. Cl.
*H04B 7/00*   (2006.01)
(52) U.S. Cl. .................................................. 455/41.2
(58) Field of Classification Search ............ 455/41.2, 455/522, 556.1, 509, 553.1, 63.1, 552.1, 455/114.2; 370/338, 461, 337
See application file for complete search history.

(56) References Cited

U.S. PATENT DOCUMENTS

| | | | | |
|---|---|---|---|---|
| 7,116,938 | B2 * | 10/2006 | Monroe et al. | 455/41.2 |
| 7,228,103 | B2 * | 6/2007 | Nowlin | 455/41.2 |
| 7,406,296 | B2 * | 7/2008 | Haartsen | 455/41.2 |
| 7,486,932 | B2 * | 2/2009 | Palin et al. | 455/41.2 |
| 2003/0125019 | A1 | 7/2003 | Bajikar | |
| 2004/0029619 | A1 * | 2/2004 | Liang et al. | 455/562.1 |
| 2005/0215197 | A1 | 9/2005 | Chen et al. | |
| 2006/0030265 | A1 * | 2/2006 | Desai et al. | 455/41.2 |
| 2006/0067312 | A1 * | 3/2006 | Ross | 370/388 |
| 2006/0084383 | A1 * | 4/2006 | Ibrahim et al. | 455/41.2 |
| 2006/0292986 | A1 * | 12/2006 | Bitran et al. | 455/41.2 |
| 2006/0292987 | A1 * | 12/2006 | Ophir et al. | 455/41.2 |
| 2007/0177542 | A1 * | 8/2007 | Hirsch | 370/329 |

FOREIGN PATENT DOCUMENTS

| | | |
|---|---|---|
| EP | 1119137 | 7/2001 |
| EP | 1389855 | 2/2004 |
| EP | 1583295 | 10/2005 |

OTHER PUBLICATIONS

Specification of the Bluetooth System. Architecture & Terminology Overview. Covered Core Package version: 2.0 + EDR Current Master TOC issued: Nov. 4, 2004.*

* cited by examiner

*Primary Examiner*—Matthew D Anderson
*Assistant Examiner*—Gennadiy Tsvey
(74) *Attorney, Agent, or Firm*—McAndrews, Held & Malloy, Ltd.

(57) ABSTRACT

Methods and systems for changing priority of slave frames in multiwire coexistence are disclosed. Aspects of one method may include communicating a high priority to the collocated WLAN device after a Bluetooth frame has started, the Bluetooth device may deassert a signal to a collocated WLAN device that indicates Bluetooth communication activity. For example, the deassertion may take place prior to a portion of a frame when said Bluetooth device transmits data. The Bluetooth device may also assert the signal that indicates Bluetooth communication activity. The Bluetooth device may then assert a signal that indicates Bluetooth priority status and the signal that indicates Bluetooth communication activity. After the Bluetooth device transmits a packet, the Bluetooth device may deassert the signal that indicates Bluetooth priority status and/or the signal that indicates Bluetooth communication activity.

25 Claims, 7 Drawing Sheets

METHOD AND SYSTEM FOR CHANGING PRIORITY OF SLAVE FRAMES IN MULTIWIRE COEXISTENCE

CROSS-REFERENCE TO RELATED APPLICATIONS/INCORPORATION BY REFERENCE

This application makes reference to U.S. patent application Ser. No. 11/439,682 filed on May 24, 2006, and the above stated application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for changing priority of slave frames in multiwire coexistence.

BACKGROUND OF THE INVENTION

Some conventional communication systems are known to support wireless and wireline communication between wireless and/or wireline communication devices. Such communication systems range from national and/or international cellular telephone systems to the Internet, and to point-to-point in-home wireless networks. Each type of communication system is designed, and hence operates, in accordance with relevant communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, for example, a cellular telephone, two-way radio, personal digital assistant (PDA), personal computer (PC), laptop computer, or home entertainment equipment, communicates directly or indirectly with other wireless communication devices. For direct communications, also known as point-to-point communications, the participating wireless communication devices tune their receivers and transmitters to the same channel, or channels, and communicate via those channel(s). Each channel may utilize one or more of the plurality of radio frequency (RF) carriers of the wireless communication system. For indirect wireless communication, each wireless communication device communicates directly with an associated base station, for example, for cellular services, and/or an associated access point, for example, for an in-home or in-building wireless network, via an assigned channel or channels.

In order for each wireless communication device to participate in wireless communication session, it utilizes a built-in radio transceiver, which comprises a receiver and a transmitter, or it is coupled to an associated radio transceiver, for example, a station for in-home and/or in-building wireless communication networks, or a RF modem. The transmitter converts data into RF signals by modulating the data in accordance with the particular wireless communication standard. However, different communication systems may use different standards, for example, the IEEE 802.11 standard and the Bluetooth standard, which may share the same RF spectrum.

In order to alleviate signal interference from sharing an RF spectrum with other communication systems, the Bluetooth standard allows frequency hopping where information is transmitted at various frequencies. In this manner, the energy of the transmitted signal is spread across a RF spectrum from 2.402 GHz to 2.480 GHz in 79 channels with each channel separated by 1 MHz. The Bluetooth standard allows 1600 frequency hops per second. The advantage of the frequency hopping system is that it spreads information across a wide band of frequencies. Therefore, signals transmitted by other systems using a portion of the same frequency spectrum may appear as noise to only some of the frequencies used by Bluetooth in frequency hopping. Similarly, only a portion of Bluetooth transmission may interfere with signals transmitted by other systems.

Two or more Bluetooth devices, up to a total of eight devices, may comprise a piconet with one master device and up to seven slave devices. The piconet may share a common communication data channel with present capacity of 1 megabits per second (Mbps) up to a theoretical maximum of 3 Mbps. This data channel is divided into time slots of 625 microseconds. Although a master device may initiate contact with any slave device, a slave device may only respond to a master device. A piconet link between a master device and a slave device may be either synchronous connection oriented (SCO) link or asynchronous connectionless (ACL) link. The piconet may support up to three SCO links, and any remaining bandwidth may be utilized by ACL links.

In some current systems, a Bluetooth device may share a platform with a WLAN device, and this may be referred to as coexistence. For example, a device such as a cellular telephone may have integrated thereon a Bluetooth radio and a Wireless LAN radio. There are times when the Bluetooth radio and the WLAN radio may need to transmit simultaneously. Since the Bluetooth radio and the WLAN radio are close to each other in distance, and both operate in the same frequency band, transmission by one radio may interfere with transmission from the other radio.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for changing priority of slave frames in multiwire coexistence, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
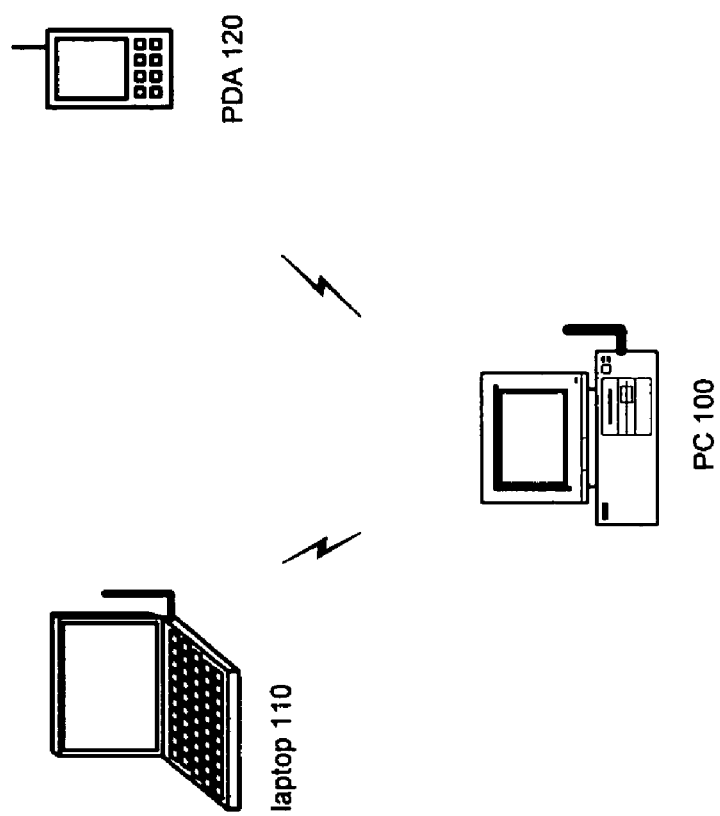
FIG. 1 illustrates a Bluetooth piconet, which may be utilized in connection with an embodiment of the invention.

Certain embodiments of the invention may be found in a method and system for changing priority of slave frames in multiwire coexistence. A slave frame may be a time period related to a Bluetooth frame with respect to a Bluetooth slave communication device. Aspects of the method may comprise a Bluetooth device communicating a high priority to a collocated WLAN device for at least a remaining portion of a current Bluetooth frame if a Bluetooth device has not asserted priority to a collocated WLAN device prior to start of a current Bluetooth frame, and if an indication exists that at least a remaining portion of said current Bluetooth frame may be high priority. The Bluetooth device may, for example, operate as a slave.

In communicating a high priority to the collocated WLAN device, the Bluetooth device may deassert a signal that indicates Bluetooth communication activity. For example, the deassertion may take place prior to a portion of a frame when said Bluetooth device transmits data. The Bluetooth device may assert the signal that indicates Bluetooth communication activity. The Bluetooth device may then assert a signal that indicates Bluetooth priority status and the signal that indicates Bluetooth communication activity. After the Bluetooth device transmits a packet, the Bluetooth device may deassert the signal that indicates Bluetooth priority status and/or the signal that indicates Bluetooth communication activity.

A multiwire coexistence method may be used to facilitate communication when, for example, a Bluetooth device is collocated with a WLAN device and both devices need to operate. Accordingly, the Bluetooth device may signal to the WLAN device when the Bluetooth device may be receiving and/or transmitting, and the WLAN device may signal to the Bluetooth device when the WLAN device may be transmitting. The Bluetooth device may indicate whether high priority is desired during a Bluetooth frame. The high priority indication may allow Bluetooth transmission without interference from a simultaneous WLAN transmission. However, the indication typically may need to be made to the WLAN device before the start of a frame.

A master Bluetooth device may be able to determine whether a frame may be high priority or low priority since Bluetooth communication may be initiated by a master Bluetooth device. However, a slave device may not always be able to indicate prior to a frame if that frame should be a high priority frame. At certain times, the slave Bluetooth device may be able to determine when a frame may be a high priority frame. For example, when a synchronous connection-oriented link (SCO) is active, the frames used for the SCO data transfer may be high priority frames. This may be because voice may be transferred via the SCO link. The SCO frames may be every frame, every other frame, or every third frame.

However, generally, a Bluetooth device may not be able determine whether a frame may be a high priority. Accordingly, a Bluetooth slave communication device may not be able to transmit a timely acknowledgment because the WLAN device may be transmitting. An embodiment of the invention may allow communicating a high priority for the current frame to the WLAN device after the current frame has started. In this manner, the Bluetooth slave communication device may transmit a timely acknowledgment without interference from the WLAN device.

FIG. 1 illustrates a Bluetooth piconet that may be utilized in connection with an embodiment of the invention. Referring to FIG. 1, there is shown a personal computer (PC) 100, a laptop 110, and a personal digital assistant (PDA) 120. These three host devices, or host platforms, may each be Bluetooth enabled. Each host device may have a Bluetooth application and a Bluetooth communication device for transmitting and receiving signals. Each host device may then be considered to be a Bluetooth device. Up to eight Bluetooth devices may communicate with each other in a local network called a piconet. In a given piconet, only one Bluetooth device may be a master, while the others may be slaves.

The process for designating a master may be a dynamic process each time a piconet is set up. A Bluetooth device may be a member of multiple piconets, where it may be designated as a master device for one piconet, and a slave device for another piconet. Each Bluetooth device may use an algorithm that takes into account different variables, for example, performance and power requirements, in deciding whether it may want to be a master device. For example, since transmitting signals to locate other Bluetooth devices to form a piconet may utilize transmission bandwidth, a Bluetooth device may wait passively for other Bluetooth devices to try to establish a piconet. A Bluetooth device that finds other Bluetooth devices, and establishes a connection with one or more Bluetooth devices, may be designated as the master Bluetooth device for that piconet. Multiple piconets that may have connection with each other, for example, where a Bluetooth device may be a member of more than one piconet, may be referred to as a scatternet.

Although only a single piconet is illustrated, in a system comprising a plurality of piconets, it may be possible for a Bluetooth device to operate as a master device in one piconet and as a slave device in an adjacent piconet. For example, a Bluetooth device A may operate as a master device in a first piconet P1 and as a slave device in a second piconet P2. In another example, the Bluetooth device A may operate as a slave device in a first piconet P1 and as a master device in a second piconet P2. A master device, for example, the PC 100, may communicate with each of the slave devices, for example, the laptop 110 and the PDA 120. However, the slave devices may not communicate directly with each other. When the master device moves out of range of communication, the piconet may be destroyed until another Bluetooth device establishes a piconet.

Figure 2A:
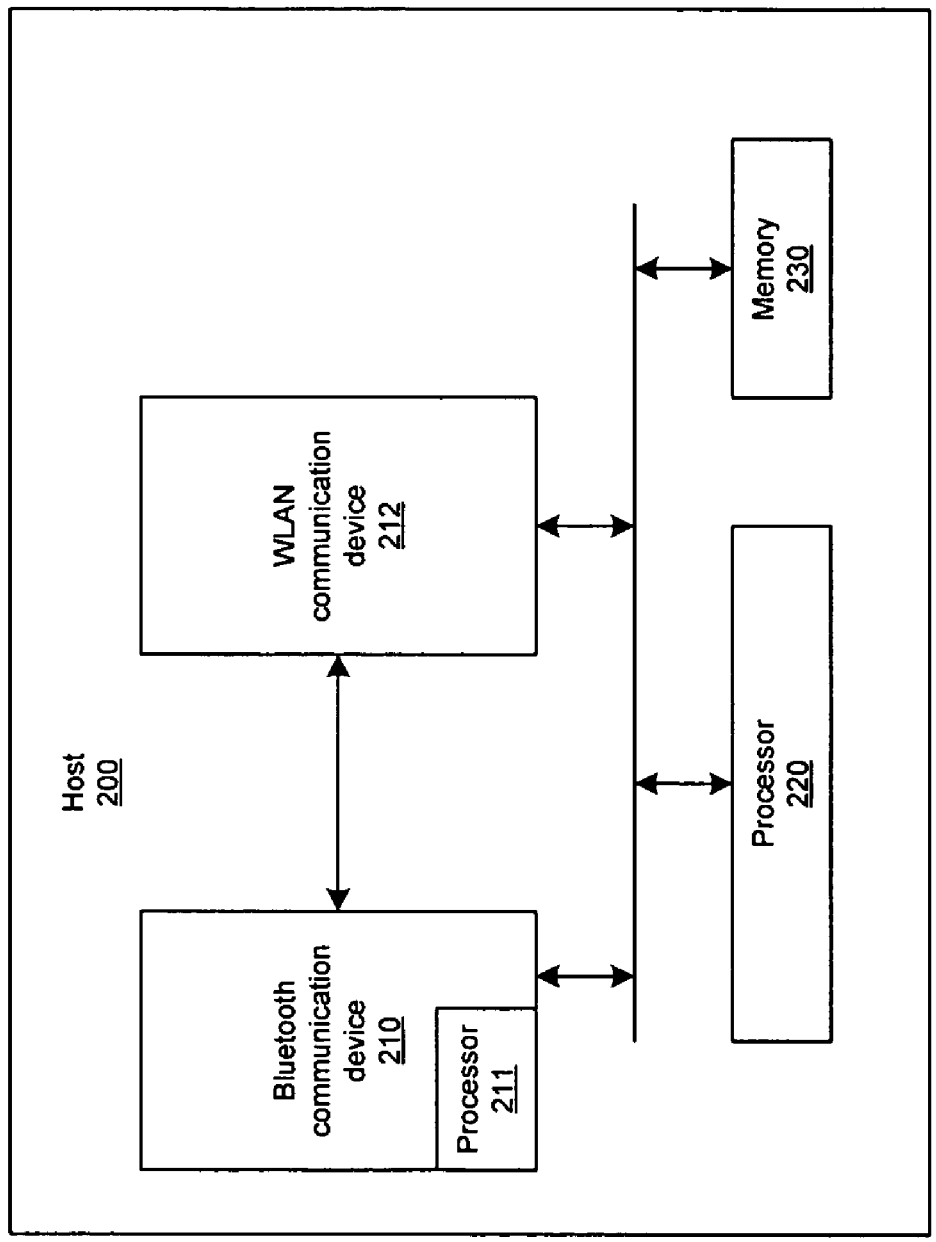
FIG. 2a is a block diagram illustrating a host device with a Bluetooth device and a WLAN device, which may be utilized in accordance with an embodiment of the invention.

FIG. 2a is a block diagram illustrating a host device with a Bluetooth device and a WLAN device, which may be utilized in accordance with an embodiment of the invention. Referring to FIG. 2, there is shown a host device 200. The host device 200 may comprise a Bluetooth communication device 210, a WLAN communication device 212, a processor 220, and memory 230. The Bluetooth communication device 210 may be a Bluetooth radio, which may comprise suitable logic, circuitry and/or code that may enable communication of data, command and/or status with other Bluetooth devices. The Bluetooth communication device 210 may comprise a processor 211. The WLAN communication device 212 may be a WLAN radio, which may comprise suitable logic, circuitry and/or code that may enable communication of data, command and/or status with other WLAN devices. The processor 220 may comprise suitable logic, circuitry and/or code that may enable communication of data, command and/or status with the Bluetooth communication device 210 and the WLAN communication device 212. The memory 230 may comprise suitable logic and/or circuitry that may enable storage of information, such as, for example, data and/or code, that may be used by other devices.

In operation, the host device 200 may be, for example, the laptop 110 that may be enabled for Bluetooth via the Bluetooth communication device 210, and connected to a LAN via the WLAN communication device 212. The processor 220 may be the main processor for the host device 200. An application that transmits via the Bluetooth communication device 210 may be a different application than the application that is accessing the LAN via the WLAN communication device 212. Accordingly, the data transmission by communication devices 210 and 212 may not be coordinated with respect to when each may transmit.

When each communication device wishes to transmit, it may assert a signal line to the other communication device. For example, a 2-wire signaling protocol or a multiwire signaling protocol may be used between a Bluetooth communication device 210 and a WLAN communication device 212. The signaling may be accomplished by, for example, the processor 211 and/or by hardware circuitry in the Bluetooth communication device 210. The signaling may be described in more detail with respect to FIGS. 2b and 2c.

Figure 2B:
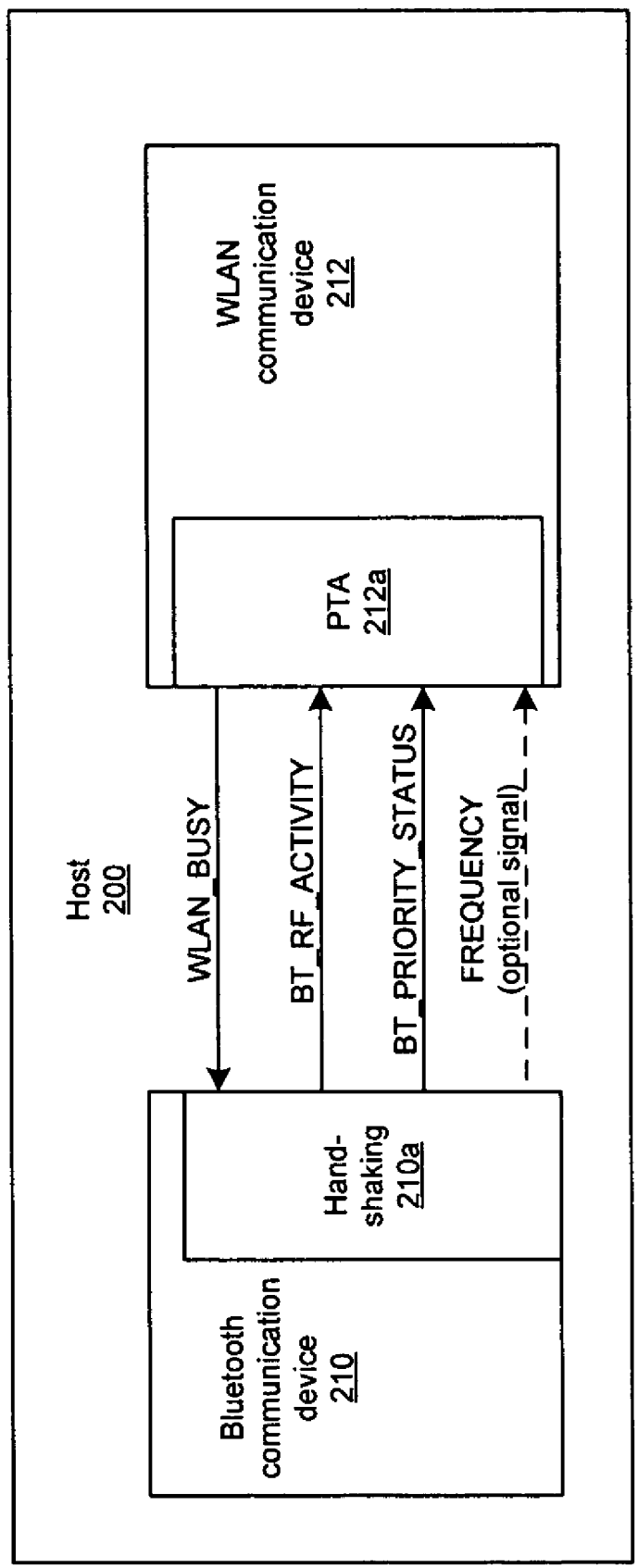
FIG. 2b is a block diagram illustrating a multiwire Bluetooth/WLAN coexistence interface, which may be utilized in connection with an embodiment of the invention.

FIG. 2b is a block diagram illustrating a multiwire Bluetooth/WLAN coexistence interface, which may be utilized in connection with an embodiment of the invention. Referring to FIG. 2b, there is shown the handshaking block 210a, and the WLAN_BUSY, BT_RF_ACTIVITY, BT_PRIORITY_STATUS, and FREQUENCY signals between the Bluetooth communication device 210 and the WLAN communication device 212.

The handshaking block 210a may comprise suitable logic, circuitry and/or code that may enable communication with the WLAN communication device 212. Accordingly, the Bluetooth communication device 210 may indicate to the WLAN device 212 that it is communicating with other Bluetooth devices and/or that it may need to transmit a high priority packet. The processor 211 or the processor 220 may control the handshaking block 210a, for example.

The WLAN_BUSY signal may be controlled by the WLAN communication device 212 and the BT_RF_ACTIVITY, BT_PRIORITY_STATUS, and FREQUENCY signals may be controlled by the handshaking block 210a. The FREQUENCY signal may be an optional signal. The BT_RF_ACTIVITY signal may be asserted by the handshaking block 210a whenever there is any transmission by the Bluetooth communication device 210. The BT_PRIORITY_STATUS signal may be used to signal a priority of a specific Bluetooth packet that is being transmitted by the Bluetooth communication device 210.

FIG. 2b may show that the signals to and from the handshaking block 210a may be communicated to the WLAN communication device 212 for simplicity. The signals to and from the handshaking block 210a that may be associated with a coexistence method used may be communicated to and from, for example, a packet traffic arbitration (PTA) unit 212a.

For example, the PTA unit 212a may receive signals from the Bluetooth communication device 210 and from the WLAN communication device 212, and may arbitrate which device may have priority for transmission and/or reception during a specific period of time. The PTA unit 212a may communicate to the Bluetooth communication device 210 to indicate whether the Bluetooth communication device 210 may have priority. The PTA unit 212a may also communicate to the WLAN communication device 212 whether it may have priority.

Accordingly, even if the BT_PRIORITY_STATUS signal is asserted, the arbitration algorithm of the PTA 212a may keep the WLAN_BUSY signal asserted. If the BT_PRIORITY_STATUS signal is not asserted, the WLAN communication device 212 may, via the PTA 212a, assert the WLAN_BUSY signal when it has data to transmit. Since the Bluetooth communication device 210 is transmitting low priority data, it may stop transmitting data. The optional FREQUENCY signal may be asserted by the handshaking block 210a when the next packet is going to be in the WLAN band. Accordingly, the multiwire coexistence interface may be used to alleviate interference that may occur when a Bluetooth communication device and a WLAN device transmits at the same time. The multiwire coexistence signaling may be described in more detail with respect to FIGS. 3a and 3b.

Figure 3A:
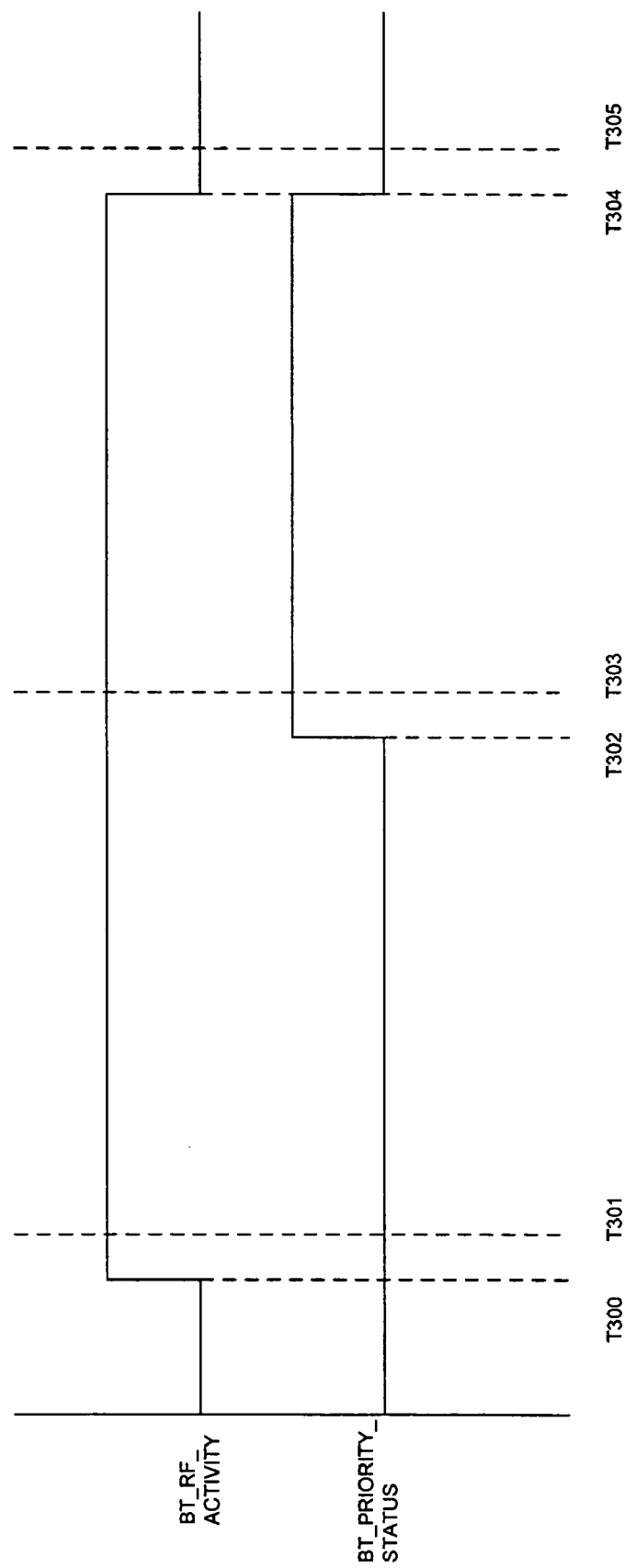
FIG. 3a is a diagram illustrating low priority frame in multiwire Bluetooth/WLAN coexistence, in connection with an embodiment of the invention.

FIG. 3a is an exemplary illustration of multiwire Bluetooth/WLAN coexistence solution for a low priority frame, in connection with an embodiment of the invention. Referring to FIG. 3a, there is shown the BT_RF_ACTIVITY signal and the BT_PRIORITY_STATUS signal that may be driven by, for example, the handshaking block 210a. The handshaking block 210a may be part of the Bluetooth communication device 210, which may be configured to operate as, for example, a slave Bluetooth device. There is also shown a plurality of time instants T300, . . . , T305 for a low priority Bluetooth frame. For a low priority frame, an acknowledgement from the slave device may not have to be sent in the same frame as the data being acknowledged.

At the time instant T300, the handshaking block 210a may assert the BT_RF_ACTIVITY signal to indicate that a Bluetooth frame may start soon. A Bluetooth frame may typically comprise two slots. A master Bluetooth communication device may transmit data during a first slot in a frame. The slave Bluetooth communication device may send acknowledgement data to the master Bluetooth communication device during a second slot in a frame. The assertion of the BT_RF_ACTIVITY signal may occur prior to start of the Bluetooth frame.

The time instant 301 may indicate when the first slot of a frame may start. The period of time from the time instant 301 to the time instant 303 may be approximately associated with the first slot in a frame, and the period of time from the time instant 303 to the time instant 305 may be approximately associated with the second slot in a frame. The Bluetooth communication device 210, which may be a slave device, may receive transmitted data by a master Bluetooth device during portions of the first slot. Although, a frame may generally comprise two slots, a frame may also comprise more than two slots. Accordingly, the period of time from the time instant 301 to the time instant 303 may comprise multiple slots and/or the time instant 303 to the time instant 305 may comprise multiple slots.

At the time instant 302, the BT_PRIORITY_STATUS signal may be asserted to indicate to the WLAN device that the Bluetooth communication device 210 may transmit data. After transmission of data, the handshaking block 210a may de-assert the BT_RF_ACTIVITY and BT_PRIORITY_STATUS signals to indicate that RF activity for the present frame may be finished. This may occur at the time instant T304.

Figure 3B:
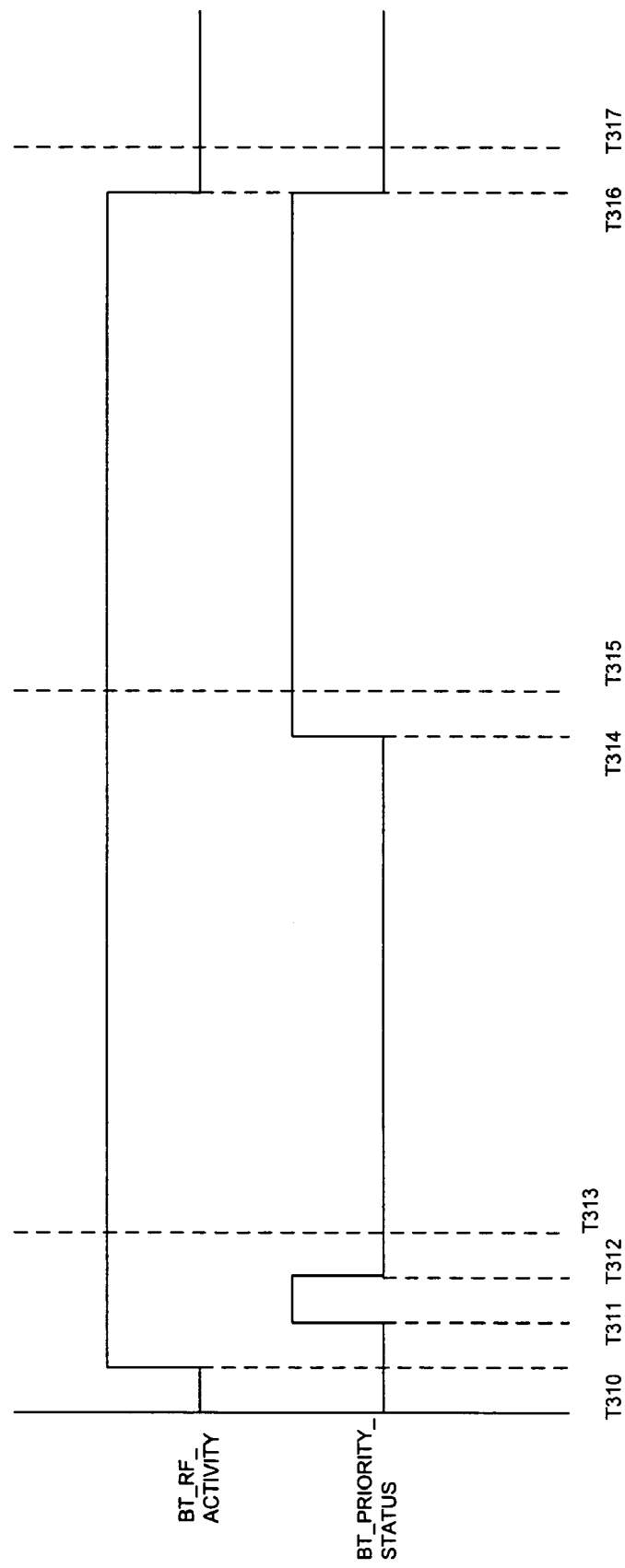
FIG. 3b is a graph illustrating high priority frame in multiwire Bluetooth/WLAN coexistence, in connection with an embodiment of the invention.

FIG. 3b is an exemplary illustration of multiwire Bluetooth/WLAN coexistence solution for a high priority frame, in connection with an embodiment of the invention. Referring to FIG. 3b, there is shown the BT_RF_ACTIVITY signal and the BT_PRIORITY_STATUS signal that may be driven by, for example, the handshaking block 210a. The handshaking block 210a may be part of the Bluetooth communication device 210, which may be, for example, a slave Bluetooth device. There is also shown a plurality of time instants T310, ..., T317 for a high priority Bluetooth frame.

High priority frames may be designated for the frames where a slave needs to acknowledge a packet from a master device in the same frame where the data packet that is being acknowledged was received. Asserting high priority to the WLAN device may allow the WLAN device to cease transmission in order not to interfere when the Bluetooth device is transmitting. The designation of specific packets for high priority may be design and/or implementation dependent. Some frames that may be designated for high priority may be, for example, synchronous connection oriented (SCO) frames that may be used for voice data.

Sometimes a slave Bluetooth device may know when some frames will be high priority frames. For example, when a slave Bluetooth device is in sniff, hold, or park mode, it may know when a high priority frame may be. The slave Bluetooth device may also know, for example, that frames allocated for a SCO link may be high priority frames. Packets may be transmitted in an SCO link via one of four methods. The first method may be the HV3 method, where every third frame may be dedicated for SCO packets. The second method may be the HV2 method, where every other frame may be dedicated for SCO packets. The third method may be the HV1 method, where every frame may be dedicated for SCO packets. The fourth method may be the DV method, where digital and voice data may be transmitted in the same packet. The DV packet may be sent every frame. Accordingly, a slave Bluetooth device may know ahead of time when a frame may be a high priority frame.

At the time instant T310, the handshaking block 210a may assert the BT_RF_ACTIVITY signal to indicate that a Bluetooth frame may start soon. While a Bluetooth frame may typically comprise two slots, there may be more than two slots in a frame. For simplicity, a frame may be assumed to be two slots. The first slot in a frame may be used by a master Bluetooth communication device to transmit data. The second slot in a frame may be used by a slave Bluetooth communication device to send acknowledgement and/or data to the master Bluetooth communication device. The assertion of the BT_RF_ACTIVITY signal may occur prior to start of the Bluetooth frame.

The time instant 313 may indicate a start of a first slot of a frame. The period of time from the time instant 313 to the time instant 315 may be approximately associated with the first slot in a frame, and the period of time from the time instant 315 to the time instant 317 may be approximately associated with the second slot in a frame. The Bluetooth communication device 210, which may be a slave Bluetooth device, may receive data from transmitted by a master Bluetooth device during portions of the first slot.

At the time instant 311, the BT_PRIORITY_STATUS signal may be asserted to indicate to the WLAN communication device 212 that the next frame may be a high priority frame. At the time instant 312, the BT_PRIORITY_STATUS signal may be deasserted to indicate to the WLAN communication device 212 that the Bluetooth communication device 210 may not be transmitting during this slot. At the time instant 314, the BT_PRIORITY_STATUS signal may be asserted to indicate that the Bluetooth communication device 210 may be transmitting during this slot.

After transmission of data, the handshaking block 210a may de-assert the BT_RF_ACTIVITY and BT_PRIORITY_STATUS signals to indicate that RF activity for the present frame may be finished. This may occur at the time instant T316. At other times, a slave device may not know whether a frame may be a high priority frame until after receiving the data from the master device. However, it may then be too late to use the method described with respect to FIG. 3b to indicate that the present frame may be a high priority frame. Accordingly, another method may be needed to indicate this, and this method is described in FIG. 3c.

Figure 3C:
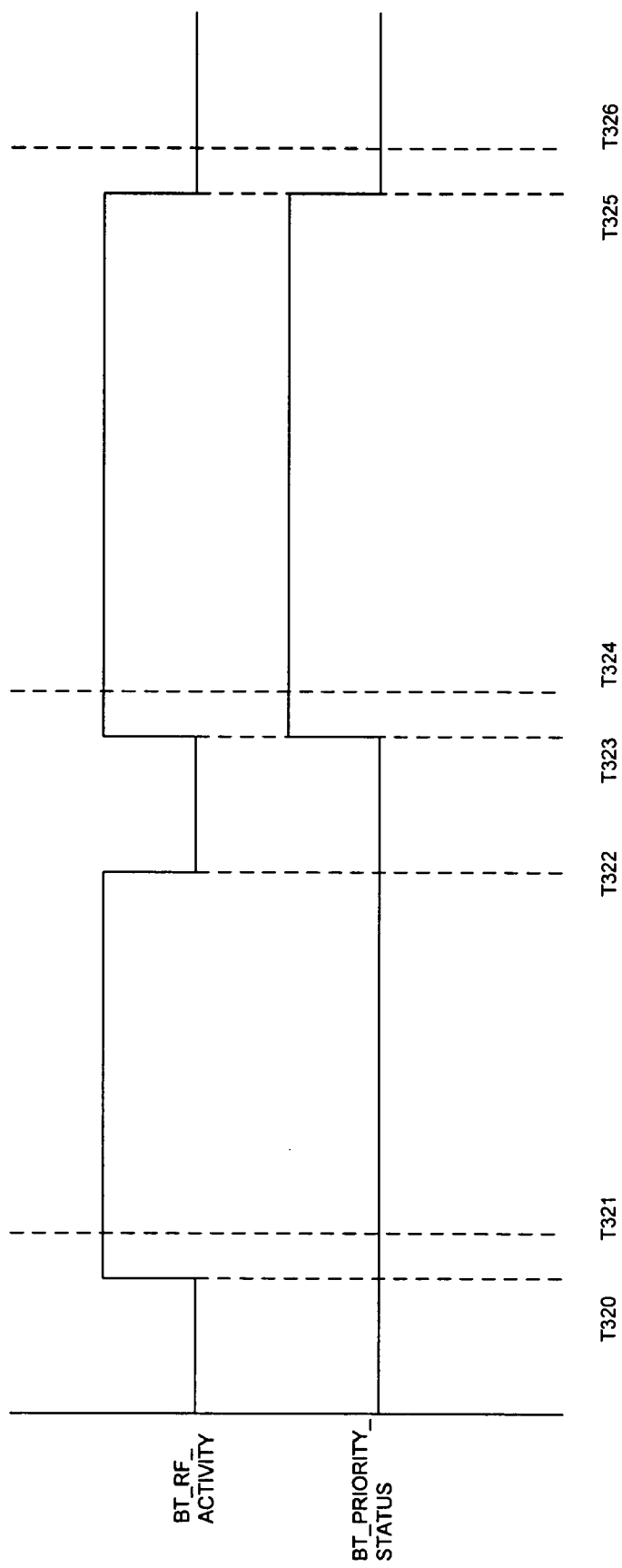
FIG. 3c is a graph illustrating changing priority of slave frames in multiwire Bluetooth/WLAN coexistence, in accordance with an embodiment of the invention.

FIG. 3c is a graph illustrating changing priority of slave frames in multiwire Bluetooth/WLAN coexistence, in accordance with an embodiment of the invention. Referring to FIG. 3c, there is shown the BT_RF_ACTIVITY signal and the BT_PRIORITY_STATUS signal that may be driven by, for example, the handshaking block 210a. The handshaking block 210a may be part of the Bluetooth communication device 210, which may be, for example, a slave Bluetooth device.

There is also shown a plurality of time instants T320, ..., T326 to illustrate changing priority of a slave frame. An embodiment of the invention may be used to invert the priority of a frame from low priority to high priority after receiving data from a master Bluetooth communication device, for example, the PC 100. The designation of specific packets for high priority may be design and/or implementation dependent. A high priority frame may be a frame where a slave Bluetooth communication device may send an acknowledgement packet in the same frame as a data packet that is being acknowledged.

At the time instant T320, the handshaking block 210a may assert the BT_RF_ACTIVITY signal to indicate that a Bluetooth frame may start soon. While a Bluetooth frame may typically comprise two slots, there may be more than two slots in a frame. For simplicity, a frame may be assumed to be two slots. The first slot in a frame may be used by a master Bluetooth communication device to transmit data. The second slot in a frame may be used by a slave Bluetooth communication device to send acknowledgement data to the master Bluetooth communication device. The assertion of the BT_RF_ACTIVITY signal may occur prior to start of the Bluetooth frame.

The time instant 321 may indicate when the first slot of a frame may start. The period of time from the time instant 321 to the time instant 324 may be approximately associated with the first slot in a frame, and the period of time from the time instant 324 to the time instant 326 may be approximately associated with the second slot in a frame.

The Bluetooth communication device 210, which may be configured to operate as a slave Bluetooth device, may receive transmitted data by a master Bluetooth device during portions of the first slot. The processor 211 or the processor 220 may parse the received data, for example. It may be determined that this may be a high priority frame. Accordingly, the WLAN may need to be notified so that it may cease transmission while the slave Bluetooth communication device 210 transmits an acknowledgement in the next slot.

At the time instant 322, the BT_RF_ACTIVITY signal may be deasserted. At the time instant 323, the BT_RF_ACTIVITY and BT_PRIORITY_STATUS signals may be asserted to indicate to the WLAN communication device 212 that the Bluetooth communication device 210 may need to transmit high priority data. After transmission of data, the handshaking block 210*a* may de-assert the BT_RF_ACTIVITY and BT_PRIORITY_STATUS signals to indicate that high priority RF activity for the present frame may be finished. This may occur at the time instant T325.

Figure 4:
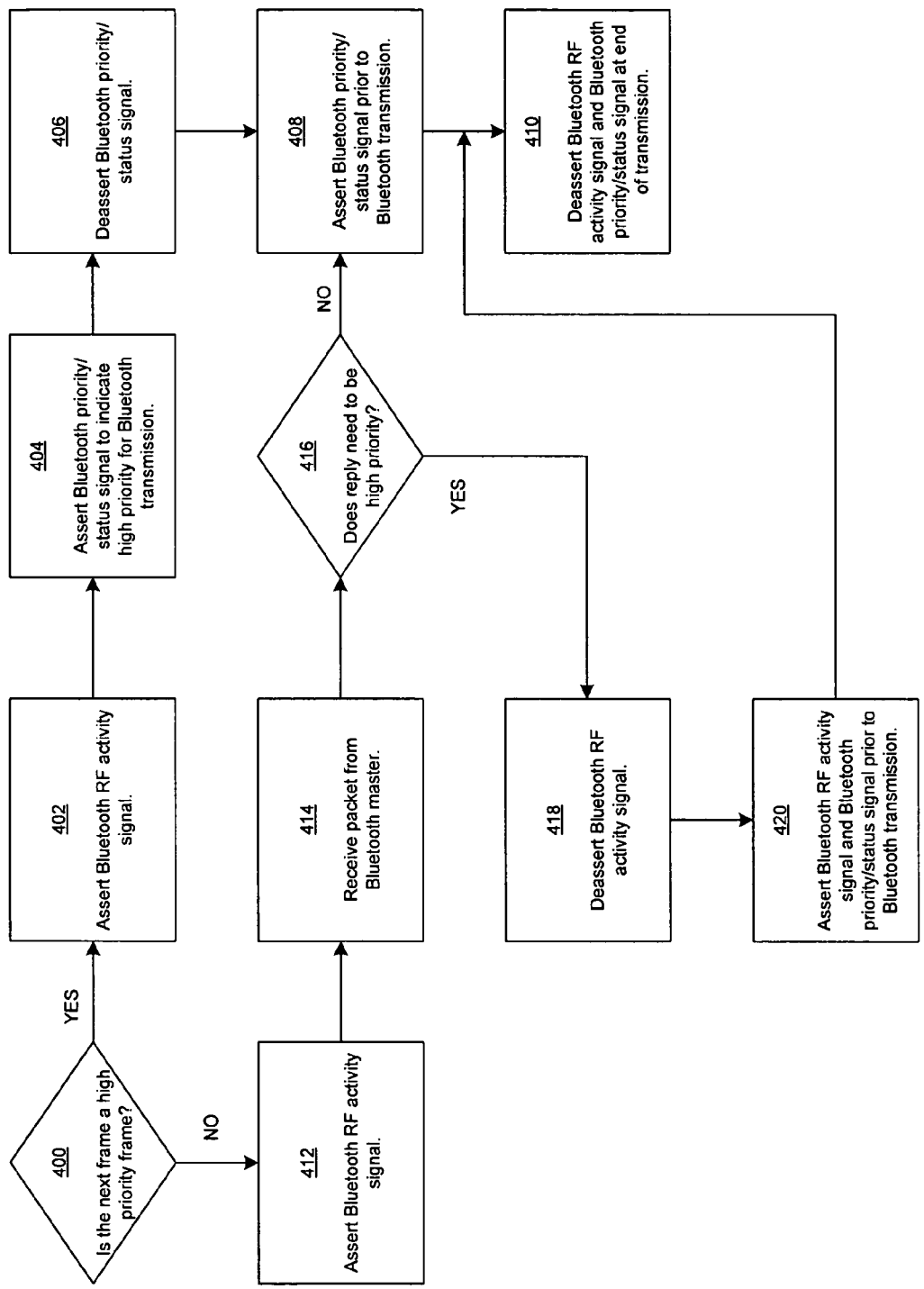
FIG. 4 is a flow chart illustrating exemplary steps for utilizing an enhanced coexistence solution for Bluetooth and WLAN communication devices, in accordance with an embodiment of the invention.

FIG. 4 is a flow chart illustrating exemplary steps for changing priority utilizing a multiwire coexistence interface for Bluetooth and WLAN communication devices, in accordance with an embodiment of the invention. Referring to FIG. 4, in step 400, the Bluetooth communication device 210 may determine whether the next frame is a high priority frame. For example, the next frame may be a high priority frame if a SCO link is set up to use the HV3 method. Accordingly, every third frame may be a high priority SCO frame. If the next frame is a high priority frame, the next step may be step 402. Otherwise, the next step may be step 412.

In step 402, the Bluetooth communication device 210 may assert a Bluetooth RF activity signal, for example, the BT_RF_ACTIVITY signal. In step 404, a Bluetooth status/priority signal may be asserted to indicate that Bluetooth RF activity for the next frame may be high priority activity. The signal asserted may be, for example, the BT_PRIORITY_STATUS signal. In step 406, the BT_PRIORITY_STATUS signal may be deasserted. This may indicate to a collocated WLAN communication device 212 that, for example, the Bluetooth communication device 210 may expect to receive Bluetooth packets.

In step 408, the BT_PRIORITY_STATUS signal may be asserted. This signal may be asserted to indicate to the collocated WLAN communication device 212 that the Bluetooth communication device 210 may subsequently transmit. In step 410, the Bluetooth communication device 210 may deassert the BT_RF_ACTIVITY and BT_PRIORITY_STATUS signals to indicate to the collocated WLAN communication device 212 that the Bluetooth frame may be finished.

In step 412, which may be the next step after the step 400, the Bluetooth communication device 210 may assert the BT_RF_ACTIVITY signal. In step 414, the Bluetooth device may receive a packet from a Bluetooth master device. Since the BT_PRIORITY_STATUS signal may not have been asserted and then deasserted after the BT_RF_ACTIVITY signal was asserted in step 412, this may indicate that this frame may be a low priority frame.

In step 416, the Bluetooth communication device 210 may process the received packet to determine whether it may need to reply as soon as possible, for example, in the same frame as the packet that was received in step 414. If a high priority reply is needed, the next step may be step 418. Otherwise the next step may be step 408.

In step 418, the BT_RF_ACTIVITY signal may be deasserted. In step 420, the BT_RF_ACTIVITY and BT_PRIORITY_STATUS signals may be asserted. This may indicate to the collocated WLAN communication device 212 that the collocated Bluetooth device may subsequently transmit at high priority. The Bluetooth communication device 210 may then transmit the reply packet. The next step may be step 410.

Although an embodiment of the invention may have been described as asserting the coexistence signals, for example, the BT_RF_ACTIVITY and BT_PRIORITY_STATUS signals, in a certain order, the invention need not be so limited. Specifications for a coexistence method may determine allowable ranges when a signal may be asserted or deasserted with respect to other signals. Accordingly, the assertion/deassertion time instants may be design and/or implementation dependent.

Another embodiment of the invention may provide a machine-readable storage, having stored thereon, a computer program having at least one code section executable by a machine, thereby causing the machine to perform the steps as described above for changing priority of slave frames in multiwire coexistence.

In accordance with an embodiment of the invention, aspects of an exemplary system may allow a Bluetooth device, for example, the Bluetooth communication device 210, to communicate with a collocated WLAN device, for example, the WLAN communication device 212. Information communicated by the Bluetooth communication device 210 may comprise, for example, priority for packets that the Bluetooth communication device 210 may transmit to another Bluetooth device, for example, the Bluetooth device PC 100. The Bluetooth communication device 210 may be configured to operate, for example, as a slave. The priority communicated may be for at least a remaining portion of a current Bluetooth frame.

The priority may be a high priority if the Bluetooth communication device 210 has not asserted high priority to a collocated WLAN communication device 212 prior to start of a current Bluetooth frame. This may occur due to an indication that at least a remaining portion of the current Bluetooth frame may be high priority. The indication may be from receiving and processing a packet from, for example, a master Bluetooth device, for example, the master device PC 100.

In communicating priority to the collocated WLAN device, the Bluetooth communication device 210 may deassert a signal that indicates Bluetooth communication activity. This signal may be, for example, the BT_RF_ACTIVITY signal. The deassertion may take place, for example, prior to a portion of the current Bluetooth frame when the Bluetooth communication device 210 may transmit data. The Bluetooth communication device 210 may also assert the signal that indicates Bluetooth communication activity, for example, the BT_RF_ACTIVITY signal. The Bluetooth communication device 210 may also assert a signal that indicates Bluetooth priority status, for example, the BT_PRIORITY_STATUS signal. After the Bluetooth communication device 210 transmits a packet, it may deassert the signal that indicates Bluetooth priority status and/or the signal that indicates Bluetooth communication activity.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for wireless communication, the method comprising:
    changing priority of a current Bluetooth frame by one or more processors and/or circuits integrated within a Bluetooth device, wherein said current Bluetooth frame comprises at least one receive portion followed by a subsequent transmit portion, said changing priority comprising:
    determining during said receive portion, whether said subsequent transmit portion of said current Bluetooth frame requires a high transmission priority based on a packet received during said receive portion of said current Bluetooth frame, wherein said Bluetooth device has not asserted a priority status signal to a collocated WLAN device prior to a start of said current Bluetooth frame; and
    if said subsequent transmit portion of said current Bluetooth frame requires said high transmission priority, asserting said priority status signal to said collocated WLAN device prior to a start of said subsequent transmit portion.

2. The method according to claim 1, comprising deasserting by said Bluetooth device, a signal that indicates Bluetooth communication activity prior to a portion of a frame when said Bluetooth device transmits data.

3. The method according to claim 1, comprising deasserting by said Bluetooth device, a signal that indicates Bluetooth communication activity.

4. The method according to claim 3, comprising asserting by said Bluetooth device, said signal that indicates Bluetooth communication activity.

5. The method according to claim 4, comprising asserting by said Bluetooth device, a signal that indicates Bluetooth priority status and said signal that indicates Bluetooth communication activity.

6. The method according to claim 5, comprising deasserting by said Bluetooth device, one or both of said signal that indicates Bluetooth priority status and said signal that indicates Bluetooth communication activity.

7. The method according to claim 1, wherein said Bluetooth device operates as a slave.

8. A machine-readable storage having stored thereon, a computer program having at least one code section for wireless communication, the at least one code section being executable by a machine for causing the machine to perform steps comprising:
    changing priority of a current Bluetooth frame by one or more processors and/or circuits integrated within a Bluetooth device, wherein said current Bluetooth frame comprises at least one receive portion followed by a subsequent transmit portion, said changing priority comprising:
    determining during said receive portion, whether said subsequent transmit portion of said current Bluetooth frame requires a high transmission priority during said subsequent transmit portion, based on a packet received during said receive portion of said current Bluetooth frame, wherein said Bluetooth device has not asserted a priority status signal to a collocated WLAN device prior to a start of said current Bluetooth frame; and
    if said subsequent transmit portion of said current Bluetooth frame requires said high transmission priority, asserting said priority status signal to said collocated WLAN device prior to a start of said subsequent transmit portion.

9. The machine-readable storage according to claim 8, wherein said at least one code section comprises code that allows deasserting by said Bluetooth device a signal that indicates Bluetooth communication activity prior to a portion of a frame when said Bluetooth device transmits data.

10. The machine-readable storage according to claim 8, wherein said at least one code section comprises code that allows deasserting by said Bluetooth device a signal that indicates Bluetooth communication activity.

11. The machine-readable storage according to claim 10, wherein said at least one code section comprises code that allows asserting by said Bluetooth device said signal that indicates Bluetooth communication activity.

12. The machine-readable storage according to claim 11, wherein said at least one code section comprises code that allows asserting by said Bluetooth device a signal that indicates Bluetooth priority status and said signal that indicates Bluetooth communication activity.

13. The machine-readable storage according to claim 12, wherein said at least one code section comprises code that allows deasserting by said Bluetooth device one or both of said signal that indicates Bluetooth priority status and said signal that indicates Bluetooth communication activity.

14. The machine-readable storage according to claim 8, wherein said Bluetooth device operates as a slave.

15. A system for wireless communication, the system comprising:
    one or more processors and/or circuits integrated within a Bluetooth device, wherein said one or more processors and/or circuits are operable to:
    change priority of a current Bluetooth frame, wherein said current Bluetooth frame comprises at least one receive portion followed by a subsequent transmit portion;
    determine during said receive portion, whether said subsequent transmit portion of said current Bluetooth frame requires a high transmission priority based on a packet received during said receive portion of said current Bluetooth frame, wherein said Bluetooth device has not asserted a priority status signal to a collocated WLAN device prior to a start of said current Bluetooth frame; and
    if said subsequent transmit portion of said current Bluetooth frame requires said high transmission priority, assert said priority status signal to said collocated WLAN device prior to a start of said subsequent transmit portion.

16. The system according to claim 15, wherein said one or more processors and/or circuits are operable to deassert a signal that indicates Bluetooth communication activity prior to a portion of a frame when said Bluetooth device transmits data.

17. The system according to claim 15, wherein said one or more processors and/or circuits are operable to deassert a signal that indicates Bluetooth communication activity.

18. The system according to claim 17, wherein said one or more processors and/or circuits are operable to deassert said signal that indicates Bluetooth communication activity.

19. The system according to claim 18, wherein said one or more processors and/or circuits are operable to deassert a signal that indicates Bluetooth priority status and said signal that indicates Bluetooth communication activity.

20. The system according to claim 19, wherein said one or more processors and/or circuits are operable to deassert one or both of said signal that indicates Bluetooth priority status and said signal that indicates Bluetooth communication activity.

21. The system according to claim 15, wherein said Bluetooth device operates as a slave.

22. A method, comprising:
communicating by a Bluetooth device, a low priority to a collocated wireless local area network (WLAN) device prior to a start of a current Bluetooth frame, wherein said current Bluetooth frame comprises at least one receive portion followed by a subsequent transmit portion;
receiving at said Bluetooth device, a Bluetooth packet during said receive portion of said current Bluetooth frame;
determining during said receive portion by said Bluetooth device, a high priority for said subsequent transmit portion of said current Bluetooth frame based on said received Bluetooth packet; and
asserting by said Bluetooth device, a priority status signal to said collocated WLAN device prior to a start of said subsequent transmit portion, wherein said Bluetooth device has not asserted said priority status signal to said collocated WLAN device prior to a start of said current Bluetooth frame.

23. The method of claim 22, wherein said communicating of said high priority comprises asserting a signal prior to the start of said transmit portion and during at least a portion of said transmit portion.

24. A system, comprising:
a Bluetooth device operable to:
communicate a low priority to a collocated wireless local area network (WLAN) device prior to a start of a current Bluetooth frame, wherein said current Bluetooth frame comprises at least one receive portion followed by a subsequent transmit portion;
receive a Bluetooth packet during said receive portion of said current Bluetooth frame;
determine during said receive portion a high priority for said subsequent transmit portion of said current Bluetooth frame based on said received Bluetooth packet; and
assert a priority status signal to said collocated WLAN device prior to a start of said subsequent transmit portion, wherein said Bluetooth device has not asserted said priority status signal to said collocated WLAN device prior to a start of said current Bluetooth frame.

25. The system of claim 24, wherein said Bluetooth device is operable to communicate said high priority by asserting a signal prior to the start of said transmit portion and during at least a portion of said transmit portion.

* * * * *